US012387500B1

(12) United States Patent
Goel et al.

(10) Patent No.: US 12,387,500 B1
(45) Date of Patent: Aug. 12, 2025

(54) PARALLEL VEHICLE MODEL PROCESSING

(71) Applicant: Zoox, Inc., Foster City, CA (US)

(72) Inventors: Kratarth Goel, Albany, CA (US); Jesse Sol Levinson, Redwood City, CA (US); Derek Xiang Ma, Redwood City, CA (US); Justin Nordgreen, San Francisco, CA (US); Adam Pollack, San Francisco, CA (US); Ekaterina Hristova Taralova, Redwood City, CA (US); Sarah Tariq, Palo Alto, CA (US)

(73) Assignee: Zoox, Inc., Foster City, CA (US)

( * ) Notice: Subject to any disclaimer, the term of this patent is extended or adjusted under 35 U.S.C. 154(b) by 825 days.

(21) Appl. No.: 17/126,335

(22) Filed: Dec. 18, 2020

(51) Int. Cl.
  *G06V 20/56* (2022.01)
  *B60W 60/00* (2020.01)
  (Continued)

(52) U.S. Cl.
  CPC ........... *G06V 20/56* (2022.01); *B60W 60/001* (2020.02); *G05B 13/0265* (2013.01);
  (Continued)

(58) Field of Classification Search
  CPC ......... B60W 2420/42; B60W 2420/40; B60W 2555/20; B60W 40/06; G06V 10/82; G06V 20/56; G06V 10/454; G06V 20/58
  See application file for complete search history.

(56) References Cited

U.S. PATENT DOCUMENTS

| 12,013,695 B1* | 6/2024 | Fields ............... B60W 30/18 |
| 2018/0050698 A1 | 2/2018 | Polisson et al. |

(Continued)

FOREIGN PATENT DOCUMENTS

| CN | 111845769 A | 10/2020 |
| CN | 211617562 | 10/2020 |
| WO | WO2020090251 A1 | 5/2020 |

OTHER PUBLICATIONS

Office Action for U.S. Appl. No. 17/126,312, mailed on May 10, 2023, Goel, "Adjusting Vehicle Models Based on Environmental Conditions", 10 pages.

(Continued)

*Primary Examiner* — Margaret G Webb
(74) *Attorney, Agent, or Firm* — Lee & Hayes, P.C.

(57) ABSTRACT

Techniques for adjusting vehicle models based on environmental conditions are discussed herein. The techniques may include receiving image data representing a portion of an environment in which a vehicle is operating and inputting the image data into a machine learned model. Additionally, data representing an environmental condition associated with the environment may be received from a sensor of the vehicle to detect changes in the environmental conditions such that one or more actions associated with the machine learned model or an output of the machine learned model may be performed. Some of the techniques may also include running multiple machine learned models or multiple configurations of a machine learned model in parallel and selecting different outputs of the machine learned model(s) to adjust for changes in the environmental conditions. For instance, individual outputs may be selected based on environmental conditions, confidence scores, thresholds, etc.

20 Claims, 5 Drawing Sheets

(51) Int. Cl.
*G05B 13/02* (2006.01)
*G05D 1/00* (2024.01)
(52) U.S. Cl.
CPC ....... *G05D 1/0088* (2013.01); *B60W 2420/40* (2013.01); *B60W 2420/403* (2013.01); *B60W 2555/20* (2020.02)

(56) References Cited

U.S. PATENT DOCUMENTS

| | | |
|---|---|---|
| 2019/0043244 A1* | 2/2019 | Ranftl .................... G06N 3/045 |
| 2019/0050692 A1* | 2/2019 | Sharma ................. G06F 18/254 |
| 2019/0286990 A1* | 9/2019 | Kenney ................ G06V 10/803 |
| 2020/0012868 A1* | 1/2020 | Hong ...................... G06V 20/56 |
| 2020/0143670 A1* | 5/2020 | Kitani .................... G06N 3/042 |
| 2021/0063167 A1 | 3/2021 | Groh et al. |
| 2021/0074091 A1* | 3/2021 | Wang .................... G07C 5/0825 |
| 2021/0086765 A1* | 3/2021 | Nordbruch ............ B60W 40/02 |
| 2021/0097311 A1* | 4/2021 | McBeth ................... H04W 4/80 |
| 2021/0097859 A1 | 4/2021 | Abari et al. |
| 2021/0185210 A1* | 6/2021 | Zhu ........................ H04N 7/181 |
| 2021/0339738 A1* | 11/2021 | Lashkari ................. G01S 17/86 |

OTHER PUBLICATIONS

Office Action for U.S. Appl. No. 17/126,312, mailed on Aug. 31, 2023, Kratarth Goel, "Adjusting Vehicle Models Based on Environmental Conditions", 13 pages.

Office Action for U.S. Appl. No. 17/126,312, mailed on Jun. 27, 2024, Goel et al., "Adjusting Vehicle Models Based on Environmental Conditions", 18 pages.

* cited by examiner

PARALLEL VEHICLE MODEL PROCESSING

BACKGROUND

Data may be captured in an environment to assist a vehicle in navigating from a first geographic location to a second geographic location. For instance, data representing an object in the environment may be captured, and the vehicle may perform an action based on the captured data. However, because vehicles operate in different geographical regions, at different times of day, in different climates, etc., the quality of captured data may vary depending on changes with respect to environmental conditions of the environment where the vehicle is operating.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
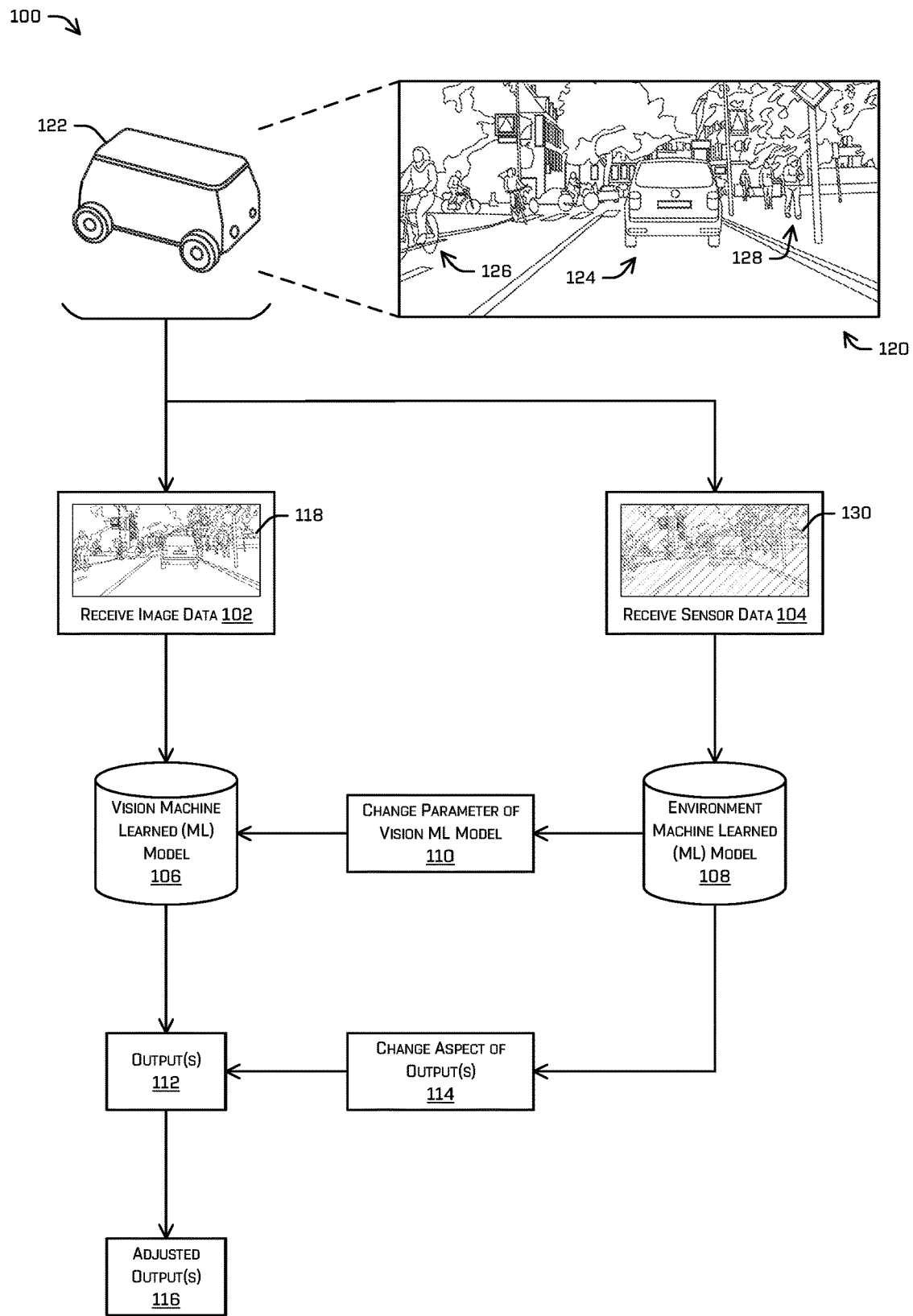
FIG. 1 is a pictorial flow diagram of an example process of capturing sensor data associated with an environmental condition and performing an action associated with a machine learned model and/or an output of the machine learned model based at least in part on the environmental condition.

Techniques for adjusting vehicle models based on environmental conditions are discussed herein. As discussed above, data may be captured in an environment to assist a vehicle in navigating from a first geographic location to a second geographic location. However, because vehicles operate in different geographical regions, at different times of day, in different climates, etc., the quality of captured data may vary depending on changes with respect to environmental conditions of the environment where the vehicle is operating. As such, it is important that vehicle computing systems are able to adjust for environmental changes.

For instance, some vehicles may include image sensors (e.g., cameras) for capturing image data associated with an environment, and this image data may be processed (e.g., input into a machine learned model) to determine, for example, locations of objects (e.g., pedestrians, cyclists, other vehicles, etc.) in the environment with respect to the vehicle, trajectories of objects in the environment, traffic signage and/or traffic rules that the vehicle is subject to (e.g., a current state associated with a traffic light of an intersection that the vehicle is approaching, a stop sign, a yield sign, etc.), a 2-dimensional or 3-dimensional bounding box associated with an object in the environment, and the like. However, the quality and/or clarity of this image data may vary depending on ambient light levels associated with the environment. For example, if the vehicle is operating during the daytime (e.g., after sunrise and before sunset) and the weather is sunny and clear, image data may be of a higher quality than if the vehicle is operating during the nighttime (e.g., after sunset and before sunrise), on a cloudy day, on a rainy day, etc.

Accordingly, this disclosure describes various technologies that, among other things, enable a vehicle to change states and/or select a vehicle model to account for changes in environmental conditions. By way of example, and not limitation, a method according to the various technologies disclosed herein may include receiving image data representing a portion of an environment in which a vehicle is operating. In some instances, the image data may be received at a computing device associated with the vehicle. Additionally, or alternatively, the image data may be received from an image sensor (e.g., camera) associated with the vehicle.

In some examples, the method may include inputting the image data into a machine learned model. The machine learned model may be associated with the vehicle. Additionally, the machine learned model may be executing on the computing device associated with the vehicle. In some instances, the machine learned model may be associated with a configuration. The configuration of the machine learned model may be trained and/or configured to process image data captured while the vehicle is operating subject to one or more environmental conditions. In other words, and by way of example, if a configuration of a machine learned model comprises a daytime configuration, then outputs of the machine learned model that are based on the daytime configuration may comprise higher confidence scores if the inputted image data was captured during the daytime. Conversely, outputs of the machine learned model that are based on the daytime configuration may comprise lower confidence scored if the inputted image data was captured during the nighttime.

In some examples, the method may include receiving, from a sensor of the vehicle, data representing an environmental condition associated with the environment. The sensor of the vehicle may comprise a photosensor, a microphone, an image sensor, a temperature sensor, a humidity sensor, or another sensor capable of producing data that is usable to detect changes in environmental conditions. Additionally, the environmental condition may comprise ambient light in the environment proximate the vehicle, precipitation, smoke, dust, smog, fog, clouds, and the like. In some examples, the data may comprise raw sensor data or processed sensor data.

In some examples, based at least in part on the data, a change in the environmental condition may be determined. For instance, the data may indicate that a level of ambient light in the environment has changed (e.g., daytime has turned into nighttime, nighttime has turned into daytime, or another condition, such as precipitation, presence of fog, smoke, etc., has caused the level of ambient light in the environment to change). The level of ambient light may be below a threshold amount of ambient light that is associated with an operational amount of the image sensor (e.g., a minimum amount of light required for the image sensor to work properly). In some instances, determining the change in the environmental condition may be based at least in part on comparing the data to previous data that was received at a time when environmental conditions were known (e.g., comparing the data to previous data received when the conditions were sunny, rainy, dark, etc.).

In some examples, the method may include performing an action associated with the machine learned model based at least in part on the change in the environmental condition. For instance, the machine learned model may comprise a first machine learned model and performing the action may comprise inputting the image data into a second machine learned model. The first machine learned model may be associated with a first configuration and the second machine learned model may be associated with a second configuration. Additionally, at least one of the first machine learned model or the first configuration may be associated with the environmental condition (e.g., daytime, first level of ambient light, etc.), and at least one of the second machine learned model or the second configuration may be associated with the change in the environmental condition (e.g., nighttime, second level of ambient light, etc.).

In some examples, performing the action associated with the machine learned model based at least in part on the change in the environmental condition may comprise altering a configuration of the machine learned model from a first configuration to a second configuration. For instance, the second configuration may be associated with the change in the environmental condition. Additionally, or alternatively, the method may include receiving an output from the machine learned model and performing the action may comprise determining a confidence level associated with the output of the machine learned model. Determining the confidence level may be based at least in part on a level of ambient light in the environment proximate the vehicle as determined from a sensor of the vehicle, and/or an ambient lighting state associated with the image data.

In some examples, performing the action associated with the machine learned model based at least in part on the change in the environmental condition may comprise changing a threshold associated with the machine learned model. Additionally, or alternatively, performing the action may comprise changing a weight associated with the machine learned model. In some instances, based at least in part on the change in the environmental condition, the image sensor of the vehicle may be adjusted to compensate for the change in the environmental condition. For instance, the image sensor of the vehicle may comprise a color changing lens capable of adjusting for changes in ambient light in the environment proximate the vehicle. Additionally, other techniques known in the art may be used to adjust the image sensor to the change in the environmental condition.

In some examples, multiple machine learned models and/or multiple configurations of a machine learned model may be run in parallel (or in a substantially parallel fashion). For instance, sensor data (e.g., image data) may be input into multiple machine learned models at once and outputs may be received from each of the multiple machine learned models. Each one of the multiple machine learned models may be associated with a different environmental condition (e.g., daytime, nighttime, precipitation, smoke, or other environmental conditions resulting in different amounts of ambient light in the environment proximate the vehicle). In this way, based at least in part on the current environmental condition, an output of the multiple machine learned models may be selected that has a higher confidence score than the other outputs.

Accordingly, in some examples the method may include inputting the sensor data into a machine learned model comprising a first configuration and a second configuration. The first configuration may be associated with a first environmental condition (e.g., first level of ambient light, first level of precipitation, first level of visibility, daytime, clear skies, etc.) and the second configuration may be associated with a second environmental condition (e.g., second level of ambient light, second level of precipitation, second level of visibility, nighttime, cloudy skies, smoke, haze, etc.). Additionally, the first configuration may comprise a first set of weights associated with the machine learned model and the second configuration may comprise a second set of weights associated with the machine learned model. In additional or alternative examples, inputting the sensor data into a machine learned model comprising a first configuration and a second configuration may include inputting the sensor data into a first machine learned model and a second machine learned model.

In some examples, the method may include receiving first output data from the machine learned model based on the first configuration and receiving second output data from the machine learned model based on the second configuration. In at least one example, the first output data may be output from a first output head associated with the machine learned model and the second output data may be output from a second output head associated with the machine learned model. In another examples, the first output data may be output from an output head at a first time (based on first parameters or weights) and the second output data may be output from the output head at a second time after the first time (based on second parameters or weights). In some examples, the first time and the second time can be sequentially in time, based on processing capabilities and technical tolerances.

In some examples, confidence scores associated with the output data may be determined. For instance, a first confidence score associated with the first output data may be determined and a second confidence score associated with the second output data may be determined. The confidence scores may be determined based at least in part on receiving the sensor data indicating the environmental condition associated with the environment in which the vehicle is operating. Additionally, or alternatively, the confidence scores may be determined based at least in part on analyzing the image data to determine an ambient lighting state associated with the image data.

In some examples, the method may include determining whether the first confidence score associated with the first output data meets or exceeds a second confidence score associated with the second output data, or vice versa. Determining whether the first confidence score meets or exceeds the second confidence score may be based at least in part on receiving the sensor data indicating the environmental condition associated with the environment in which the vehicle is operating.

In some examples, the method may include outputting the first output data based at least in part on the first confidence score meeting or exceeding the second confidence score. Additionally, or alternatively, if the first confidence score is equal to the second confidence score or within a threshold range of equality, the method may include merging the first output data and the second output data.

The techniques described herein may improve the functioning of a computing device by providing a robust method of determining changes in environmental conditions associated with environments in which a vehicle is operating, and adjusting vehicle states, adjusting model outputs, and/or selecting model outputs to adjust for changes in environmental conditions. In this way, more accurate representations of data associated with the environment in which the vehicle is operating may be determined, thus allowing the vehicle to more safely navigate between geographic locations. For instance, by using multiple machine learned models running in parallel and/or by adjusting configurations of machine learned models to compensate for changes in environmental conditions as discussed herein, accuracy of vehicle perception systems may be improved as these perception systems will be more easily able to detect the presence of objects in the environment of the vehicle, trajectories of objects in the environment, traffic signage and/or traffic rules the vehicle is subject to, and the like. In some examples, the use of a dedicated ambient light sensor provides a robust method of determining ambient conditions and/or provides redundant sensors for making a determination regarding environmental conditions. These and other improvements to the functioning of the computer are discussed herein.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a sensor system or a robotic platform), and are not limited to autonomous vehicles. In one example, similar techniques may be utilized in driver-controlled vehicles in which such a system may provide an indication of whether it is safe to perform various maneuvers. In another example, the techniques may be utilized in an aerial context, a nautical context, and the like. Additionally, the techniques described herein may be used with real data (e.g., captured using sensor(s)), simulated data (e.g., generated by a simulator), or any combination of the two.

FIG. 1 is a pictorial flow diagram of an example process 100 of capturing sensor data associated with an environmental condition and performing an action associated with a machine learned model and/or an output of the machine learned model based at least in part on the environmental condition.

An operation 102 may include receiving image data 118 associated with an environment 120 in which a vehicle 122 is operating. The image data 118 may include any number and type of objects of the environment 120. As illustrated, the image data 118 associated with the environment 120 includes an object 124 (e.g., a vehicle), an object 126 (e.g., a cyclist), and an object 128 (e.g., a pedestrian). Although discussed in the context of image data, the operation 102 may include receiving other sensor data such as lidar data, radar data, audio data, time of flight data, and the like. Further, the operation 102 may include receiving the image data 118 from a single sensor (e.g., single image sensor/camera) or multiple sensors (e.g., multiple image sensor/cameras). The operation 102 may include receiving image data associated with a single time (or image data associated with substantially the same time, based on technical tolerances) or image data captured over a period of time. In some examples, the operation 102 may be performed by computing device associated with the vehicle 122 as it traverses the environment 120.

An operation 104 may include receiving sensor data 130 associated with the environment 120 in which the vehicle 122 is operating. The sensor data 130 may be indicative of an environmental condition associated with the environment 120, such as a level of ambient light, as shown. The sensor data 130 may comprise ambient light data captured by an ambient light sensor (e.g., photosensor) of the vehicle 122. Additionally, or alternatively, the sensor data 130 may comprise audio data captured by a microphone of the vehicle 122. The audio data may be indicative of a level of precipitation in the environment 120 (e.g., whether it is raining, snowing, hailing, etc.). Although discussed in the contexts of ambient light data and audio data, the sensor data 130 may additionally or alternatively comprise image data, such as image data 118, temperature data, humidity/moisture data, smoke data, air quality data, and/or any combination thereof.

The use of sensor data indicating a real-time environmental condition of a vehicle can enable the vehicle 122 to adapt to different environmental conditions by changing a configuration of a machine learned model as disclosed herein. Use of generalized weather, GPS, and/or time information may be used in conjunction with the real-time sensor data and may not indicate localized conditions or may not allow the vehicle 122 to react quickly to changing conditions. For example, a vehicle entering a tunnel may experience a changed environment that can be detected through the use of real-time sensor data.

An operation 106 may include inputting the image data 118 into a vision machine learned model. The vision machine learned model may be associated with a vision or perception system of the vehicle 122. In some instances, operation 106 may include inputting the image data 118 into a machine learned model that is associated with a configuration. The configuration of the machine learned model may be associated with an environmental condition (e.g., a level of ambient light, daytime, nighttime, precipitation, etc.) That is, the configuration of the machine learned model may be trained to generate outputs from image data captured during a time when the vehicle 122 was operating subject to the environmental condition.

An operation 108 may include inputting the sensor data 130 into an environment machine learned model. The machine learned model may be associated with an environmental system of the vehicle 122 that determines environmental conditions associated with the environment 120 in which the vehicle 122 is operating. For instance, the environment machine learned model may be able to receive, as inputs, various types of data indicative of environmental conditions (e.g., temperature data, photosensor data, audio data, humidity/moisture data, smoke data, etc.) and determine one or more outputs (e.g., a temperature of the environment, a level of ambient light in the environment, a level of humidity in the environment, a level of precipitation in the environment, etc.). In some instances, the one or more outputs of the environment machine learned model may include performing one or more actions associated with another machine learned model associated with the vehicle, such as the vision machine learned model.

An operation 110 may include changing a parameter of the vision machine learned model. For instance, based at least in part on the environment machine learned model detecting a change in the environmental conditions, the environment machine learned model may cause the parameter of the vision machine learned model to be changed. In this way, outputs of the vision machine learned model may comprise higher confidence levels than if the parameter was not changed. In some cases, changing the parameter of the vision machine learned model may comprise changing the configuration of the vision machine learned model. Additionally, or alternatively, changing the parameter of the vision machine learned model may comprise changing a threshold associated with the machine learned model, changing a weight associated with the machine learned model, and the like.

An operation 112 may include receiving one or more outputs from the vision machine learned model. The output data may be output from an output head associated with the vision machine learned model. An operation 114 may include changing an aspect of the one or more outputs. For instance, based at least in part on the environment machine learned model detecting the change in the environmental condition, the environment machine learned model may change the aspect of the one or more outputs to compensate for the change in the environmental condition. Accordingly, operation 116 may include receiving one or more adjusted outputs based on the input image data 118. In some examples, the vehicle 122 may be controlled based at least in part on the one or more outputs or adjusted outputs. For instance, a trajectory for the vehicle 122 to follow may be generated, a trajectory may be altered or modified, a safe-stop trajectory may be initiated, a request for instruction to a remote operator may be sent, and/or the like.

Figure 2:
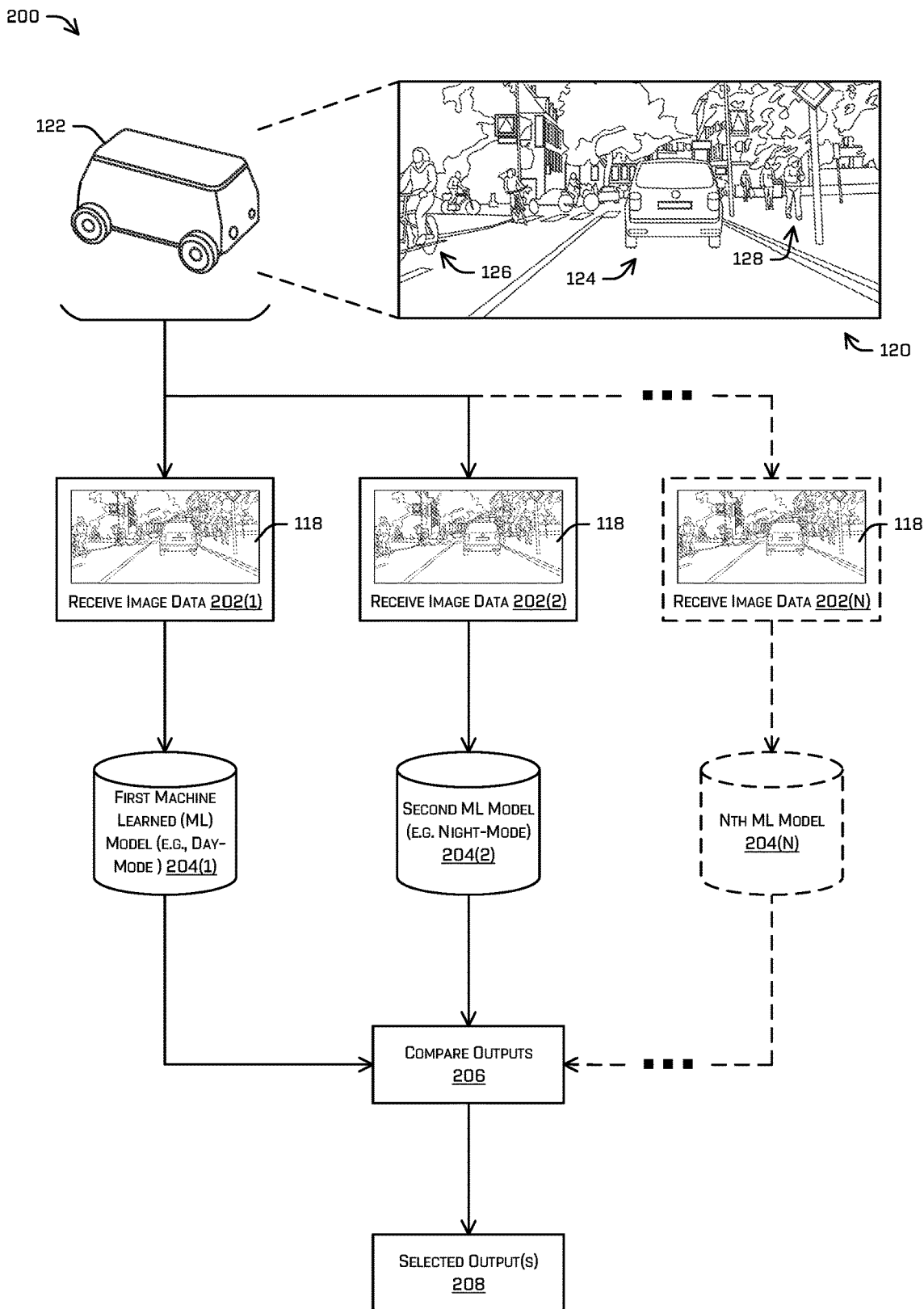
FIG. 2 is a pictorial flow diagram of an example process of capturing image data, inputting the image data into multiple machine learned models running in parallel, and selecting an output of the multiple machine learned models.

FIG. 2 is a pictorial flow diagram of an example process 200 of capturing image data, inputting the image data into multiple machine learned models running in parallel, and selecting an output of the multiple machine learned models. In some examples, the number of machine learned models running in parallel may vary. For instance, the number of machine learned models running in parallel may include two machine learned models, three machine learned models, four machine learned models, etc.

Operations 202(1), 202(2), and 202(N) (where N represents any number greater than or equal to 3, in this example) may include receiving image data 118 associated with an environment 120 in which a vehicle 122 is operating. The image data 118 may include any number and type of objects of the environment 120. As illustrated, the image data 118 associated with the environment 120 includes an object 124 (e.g., a vehicle), an object 126 (e.g., a cyclist), and an object 128 (e.g., a pedestrian). Although discussed in the context of image data, the operations 202(1), 202(2), and 202(N) may include receiving lidar data, radar data, audio data, time of flight data, and the like. Further, the operations 202(1), 202(2), and 202(N) may include receiving the image data 118 from a single sensor (e.g., single image sensor/camera) or multiple sensors (e.g., multiple image sensor/cameras). The operations 202(1), 202(2), and 202(N) may include receiving image data associated with a single time (or image data associated with substantially the same time, based on technical tolerances) or image data captured over a period of time. In some examples, the operations 202(1), 202(2), and 202(N) may be performed by computing device associated with the vehicle 122 as it traverses the environment 120.

Operations 204(1), 204(2), and 204(N) may include inputting the image data 118 into a first machine learned model, a second machine learned model, and an Nth machine learned model, respectively (where N represents any number greater than or equal to 3, in this example). In some examples, the first machine learned model may comprise a day-mode machine learned model, the second machine learned model may comprise a night-mode machine learned model, and the Nth machine learned model may comprise another machine learned model associated with a different operating mode (e.g., a rain-mode, a snow-mode, a smoke-mode, a fog-mode, an overcast-mode, and the like). In some instances, the first, second, and Nth machine learned models may comprise different machine learned models and in other instances the first, second, and Nth machine learned models may comprise the same machine learned model that are operating according to different configurations, where each configuration is associated with a different environmental condition.

By way of example, and without limitation, a "day-mode" model may include a machine learned model trained using training data specific to one set of environmental conditions, such as image data captured in the daytime or with an amount of ambient light above a threshold. Similarly, a "night mode" model may include a machine learned model trained using other training data specific to another set of environmental conditions, such as image data captured at night or with an ambient light below a threshold. Further, various models may be "tuned" for performance in different environment, for example, by selecting or otherwise determining thresholds, parameters, and the like, to optimize a model for an environmental condition. Additional models are contemplated herein. Examples of environmental conditions can include change due to weather (e.g., snow, fog, smoke from a fire, etc.) and/or other conditions (e.g., entering a well-lit tunnel at night, entering a bright urban environment at night, entering a dark tunnel during the day, etc.).

In some examples, configurations of machine learned models can differ based on weightings. The weightings can take the form of different sets of tensors stored in memory of a computer device implementing the machine learned model(s) while the architecture of the machine-learned model (e.g., the configuration of a neural network) may remain substantially constant across configurations. The use of different sets of weights (e.g., tensors) can allow relatively quick switching between different configurations of machine-learned models as the machine-learned model architecture can stay in memory between switching of configuration information. In some examples, similarities between different configurations can be determined such that only a portion of a set of weights (e.g., tensors) can be reconfigured. For example, some nodes or layers of a neural network may maintain the same weights between configurations.

An operation 206 may include receiving outputs from the machine learned models and comparing the outputs. In some examples, comparing the outputs may comprise comparing confidence scores associated with each of the outputs to determine which machine learned model produced the output with the highest confidence score. In some instances, output data from each of the machine learned models may be output from respective output heads associated with the machine learned models. For example, first output data may be output from a first output head associated with the first machine learned model, second output data may be output from a second output head associated with the second machine learned model, Nth output data may be output from an Nth output head associated with the Nth machine learned model, and so forth. In some examples, the confidence score associated with an output may be based at least in part on sensor data indicating an environmental condition associated with the environment 120 during a period of time when the image data 118 was captured.

An operation 208 may include outputting one or more selected outputs based at least in part on comparing the outputs. For instance, an output with the highest confidence score may be selected to be output. Additionally, or alternatively, an output that comprises a confidence score that is greater than a threshold confidence score may be selected to be output. In some examples, if multiple outputs comprise confidence scores greater than the threshold confidence score or multiple outputs comprise the same confidence score, then the outputs may be merged such that the selected output comprises a combination of two or more outputs. In some examples, outputting the one or more selected outputs may be based at least in part on the sensor data indicating the environmental condition associated with the environment 120 during the period of time when the image data 118 was captured. For instance, if the image data 118 was captured during the nighttime, then the output of the second machine learned model that is associated with the night-mode may be selected. In some examples, the vehicle 122 may be controlled based at least in part on the one or more selected outputs. For instance, a trajectory for the vehicle 122 to follow may be generated, a trajectory may be altered or modified, a safe-stop trajectory may be initiated, a request for instruction to a remote operator may be sent, and/or the like.

Figure 3:
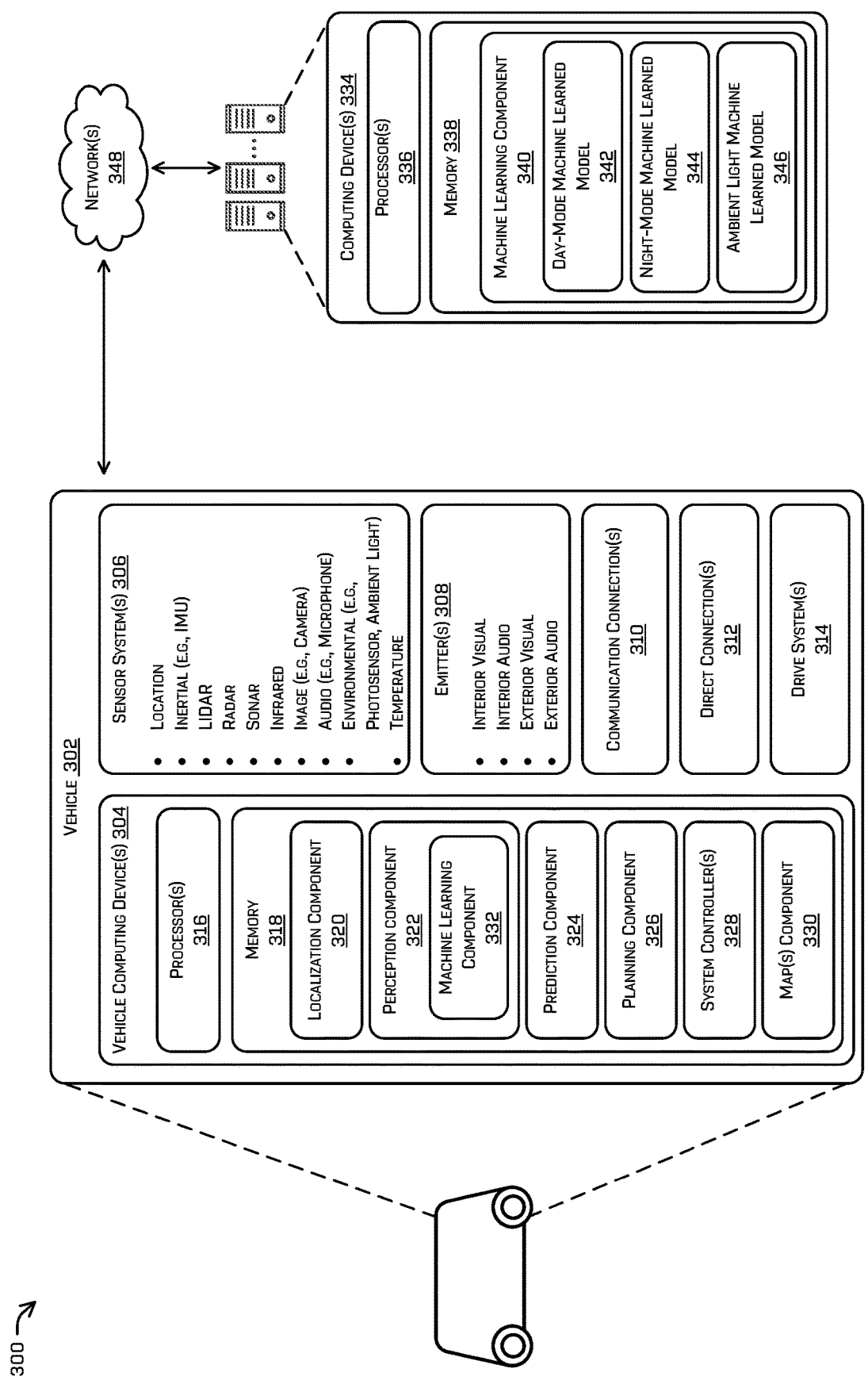
FIG. 3 depicts a block diagram of an example system for implementing the techniques described herein.

FIG. 3 depicts a block diagram of an example system 300 for implementing the techniques described herein. In at least one example, the system 300 may include a vehicle 302. In the illustrated example system 300, the vehicle 302 is an autonomous vehicle; however, the vehicle 302 may be any other type of vehicle.

The vehicle 302 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 302 may be configured to control all functions from start to completion of the trip, including all parking functions, it may not include a driver and/or controls for driving the vehicle 302, such as a steering wheel, an acceleration pedal, and/or a brake pedal. This is merely an example, and the systems and methods described herein may be incorporated into any ground-borne, airborne, or water-borne vehicle, including those ranging from vehicles that need to be manually controlled by a driver at all times, to those that are partially or fully autonomously controlled.

The vehicle 302 may include one or more computing device(s) 304, one or more sensor system(s) 306, one or more emitter(s) 308, one or more communication connection(s) 310 (also referred to as communication devices and/or modems), at least one direct connection 312 (e.g., for physically coupling with the vehicle 302 to exchange data and/or to provide power), and one or more drive system(s) 314. The one or more sensor system(s) 306 may be configured to capture sensor data associated with an environment.

The one or more sensor system(s) 306 may include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, photosensors, pressure sensors, etc.), ultrasonic transducers, wheel encoders, etc. The one or more sensor system(s) 306 may include multiple instances of each of these or other types of sensors. For instance, the environmental sensors may include individual environmental sensors located at the corners, front, back, sides, and/or top of the vehicle 302. As another example, the camera sensors may include multiple cameras disposed at various locations about the exterior and/or interior of the vehicle 302. As yet another example, the audio sensors may include an array of audio sensors to determine location and/or directionality associated with audio sources. The one or more sensor system(s) 306 may provide input to the computing device 304.

The vehicle 302 may also include one or more emitter(s) 308 for emitting light and/or sound. The one or more emitter(s) 308 in this example include interior audio and visual emitters to communicate with passengers of the vehicle 302. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 308 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 302 may also include one or more communication connection(s) 310 that enable communication between the vehicle 302 and one or more other local or remote computing device(s) (e.g., a remote teleoperation computing device) or remote services. For instance, the one or more communication connection(s) 310 may facilitate communication with other local computing device(s) on the vehicle 302 and/or the one or more drive system(s) 314. Also, the one or more communication connection(s) 310 may allow the vehicle 302 to communicate with other nearby computing device(s) (e.g., other nearby vehicles, traffic signals, etc.). Additionally, the one or more communication connection(s) 310 may allow the vehicle to communicate, over one or more external network(s) 348 with one or more remote computing device(s) 334.

The one or more communications connection(s) 310 may include physical and/or logical interfaces for connecting the computing device 304 to another computing device or one or more external networks 348 (e.g., the Internet). For example, the one or more communications connection(s) 310 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

In at least one example, the vehicle 302 may include one or more drive system(s) 314. In some examples, the vehicle 302 may have a single drive system 314. In at least one example, if the vehicle 302 has multiple drive systems 314, individual drive systems 314 may be positioned on opposite ends of the vehicle 302 (e.g., the front and the rear, etc.). In at least one example, the drive system(s) 314 may include one or more sensor system(s) 306 to detect conditions of the drive system(s) 314 and/or the surroundings of the vehicle 302. By way of example and not limitation, the sensor system(s) 306 may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 314. In some cases, the sensor system(s) 306 on the drive system(s) 314 may overlap or supplement corresponding systems of the vehicle 302 (e.g., sensor system(s) 306).

The drive system(s) 314 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 314 may include a drive system controller which may receive and preprocess data from the sensor system(s) 306 and to control operation of the various vehicle systems. In some examples, the drive system controller may include one or more processor(s) and memory communicatively coupled with the one or more processor(s). The memory may store one or more components to perform various functionalities of the drive system(s) 314. Furthermore, the drive system(s) 314 also include one or more communication connection(s) that enable communication by the respective drive system with one or more other local or remote computing device(s).

The computing device 304 may include one or more processor(s) 316 and memory 318 communicatively coupled with the one or more processor(s) 316. In the illustrated example, the memory 318 of the computing device 304 stores a localization component 320, a perception component 322 comprising a machine learning component 332, a prediction component 324, a planning component 326, one or more system controller(s) 328, and a maps component 330. Though depicted as residing in the memory 318 for illustrative purposes, it is contemplated that the localization component 320, the perception component 322, the prediction component 324, the planning component 326, the one or more system controller(s) 328, and the maps component 330 may additionally, or alternatively, be accessible to the computing device 304 (e.g., stored in a different component of vehicle 302) and/or be accessible to the vehicle 302 (e.g., stored remotely in a memory 338 of the computing devices 334).

The localization component 320 may include functionality to receive data from the sensor system(s) 306 and/or other components to determine a position of the vehicle 302. For example, the localization component 320 may include and/or request/receive a three-dimensional map of an environment and may continuously determine a location of the autonomous vehicle within the map. In some instances, the localization component 320 may use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 320 may provide data to various components of the vehicle 302 to determine an initial position of an autonomous vehicle for generating a trajectory, as discussed herein.

The perception component 322 may include functionality to perform object detection, segmentation, and/or classification. In some examples, the perception component 322 and/or the machine learning component 332 may provide processed sensor data that indicates a presence of an entity that is proximate to the vehicle 302 and/or a classification of the entity as an entity type (e.g., car, pedestrian, cyclist, building, tree, road surface, curb, sidewalk, unknown, etc.). In additional and/or alternative examples, the perception component 322 and/or the machine learning component 332 may provide processed sensor data that indicates one or more characteristics associated with a detected entity and/or the environment in which the entity is positioned. In some examples, characteristics associated with an entity may include, but are not limited to, an x-position (global position), a y-position (global position), a z-position (global position), an orientation, an entity type (e.g., a classification), a velocity of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

Further, the perception component 322 may include functionality to store perception data generated by the perception component 322 and/or the machine learning component 332. In some instances, the perception component 322 and/or the machine learning component 332 may determine a track corresponding to an object that has been classified as an object type. For purposes of illustration only, the perception component 322, using sensor system(s) 306 may capture one or more images of an environment. The sensor system(s) 306 may capture images of an environment that includes an object, such as a pedestrian. The pedestrian may be at a first position at a time T and at a second position at time T+t (e.g., movement during a span of time t after time T). In other words, the pedestrian may move during this time span from the first position to the second position. Such movement may, for example, be logged as stored perception data associated with the object.

The stored perception data may, in some examples, include fused perception data captured by the vehicle. Fused perception data may include a fusion or other combination of sensor data from sensor system(s) 306, such as image sensors, lidar sensors, radar sensors, time-of-flight sensors, sonar sensors, global positioning system sensors, internal sensors, and/or any combination of these. The stored perception data may additionally or alternatively include classification data including semantic classifications of objects (e.g., pedestrians, vehicles, buildings, road surfaces, etc.) represented in the sensor data. The stored perception data may additionally or alternatively include track data (positions, orientations, sensor features, etc.) corresponding to motion of objects classified as dynamic objects through the environment. The track data may include multiple tracks of multiple different objects over time. This track data may be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

The machine learning component 332 of the perception component 322 may include functionality to generate models for determining changes in environmental conditions as discussed herein, for controlling the vehicle 302 in different environmental conditions, for adjusting models based on changes in environmental conditions, and the like. For example, the machine learning component 332 receive sensor data (e.g., image data) as an input and, based at least in part on an environmental condition associated with an environment in which the vehicle 302 is operating, change a configuration associated with a model that the sensor data is to be input into, input the sensor data into a different model, alter an aspect of an output of the model, and the like.

The prediction component 324 may generate one or more probability maps representing prediction probabilities of possible locations of one or more objects in an environment. For example, the prediction component 324 may generate one or more probability maps for vehicles, pedestrians, animals, and the like within a threshold distance from the vehicle 302. In some instances, the prediction component 324 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

The planning component 326 may determine a path for the vehicle 302 to follow to traverse through an environment. For example, the planning component 326 may determine various routes and paths and various levels of detail. In some instances, the planning component 326 may determine a route to travel from a first location (e.g., a current location) to a second location (e.g., a target location). For the purpose of this discussion, a route may be a sequence of waypoints for traveling between two locations. As non-limiting examples, waypoints include streets, intersections, global positioning system (GPS) coordinates, etc. Further, the planning component 326 may generate an instruction for guiding the autonomous vehicle along at least a portion of the route from the first location to the second location. In at least one example, the planning component 326 may determine how to guide the autonomous vehicle from a first waypoint in the sequence of waypoints to a second waypoint in the sequence of waypoints. In some examples, the instruction may be a path, or a portion of a path. In some examples, multiple paths may be substantially simultaneously generated (i.e., within technical tolerances) in accordance with a receding horizon technique. A single path of the multiple paths in a receding data horizon having the highest confidence level may be selected to operate the vehicle.

In other examples, the planning component 326 may alternatively, or additionally, use data from the perception component 322 (e.g., outputs of the machine learning component 332) and/or the prediction component 324 to determine a path for the vehicle 302 to follow to traverse through an environment. For example, the planning component 326 may receive data from the perception component 322 and/or the prediction component 324 regarding objects associated with an environment. Using this data, the planning component 326 may determine a route to travel from a first location (e.g., a current location) to a second location (e.g., a target location) to avoid objects in an environment. In at least some examples, such a planning component 326 may determine there is no such collision free path and, in turn, provide a path which brings vehicle 302 to a safe stop avoiding all collisions and/or otherwise mitigating damage.

In at least one example, the computing device 304 may include one or more system controller(s) 328, which may be configured to control steering, propulsion, braking, safety, emitters, communication, and other systems of the vehicle 302. These system controller(s) 328 may communicate with and/or control corresponding systems of the drive system(s) 314 and/or other components of the vehicle 302, which may be configured to operate in accordance with a path provided from the planning component 326.

The memory 318 may further include a map(s) component 330. The map(s) component 330 may store one or more maps that may be used by the vehicle 302 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. A map may further include an object identifier, an object classification, a three-dimensional location, covariance data (e.g., represented in image data or a multi-resolution voxel space), and the like. In some instances, a map may include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels") (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some instances, the map may be stored in a tiled format, such that individual tiles of the map represent a discrete portion of an environment, and may be loaded into working memory as needed, as discussed herein. In at least one example, the map(s) component 330 may include at least one map (e.g., images and/or a mesh). In some examples, the vehicle 302 may be controlled based at least in part on the map(s) component 330. That is, the map(s) component 330 may be used in connection with the localization component 320, perception component 322 (and sub-components), the prediction component 324, and/or the planning component 326 to determine a location of the vehicle 302, identify objects in an environment, generate prediction probabilit(ies) associated with objects and/or the vehicle 302, and/or generate routes and/or trajectories to navigate within an environment.

The vehicle 302 may connect to computing device(s) 334 via network 348 and may include one or more processor(s) 336 and memory 338 communicatively coupled with the one or more processor(s) 336. In at least one instance, the one or more processor(s) 336 may be similar to the processor(s) 316 and the memory 338 may be similar to the memory 318. In the illustrated example, the memory 338 of the computing device(s) 334 stores a machine learning component 340 comprising a day-mode machine learned model 342, a night-mode machine learned model 344, and an ambient light machine learned model 346, as discussed herein. Though depicted as residing in the memory 338 for illustrative purposes, it is contemplated that the machine learning component 340 and/or the day-mode machine learned model 342, the night-mode machine learned model 344, and the ambient light machine learned model 346 may additionally, or alternatively, be accessible to the computing device(s) 334 (e.g., stored in a different component of computing device(s) 334 and/or be accessible to the computing device(s) 334 (e.g., stored remotely). Additionally, or alternatively, in some examples the day-mode machine learned model 342, the night-mode machine learned model 344, and the ambient light machine learned model 346 may reside in the machine learning component 332 of the vehicle 302. The day-mode machine learned model 342, the night-mode machine learned model 344, and the ambient light machine learned model 346 are examples of different machine learned models or different configurations of machine learned models, as discussed herein.

The processor(s) 316 of the computing device 304 and the processor(s) 336 of the computing device(s) 334 may be any suitable processor capable of executing instructions to process data and perform operations as described herein. By way of example and not limitation, the processor(s) 316 and 336 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

The memory 318 of the computing device 304 and the memory 338 of the computing device(s) 334 are examples of non-transitory computer-readable media. The memory 318 and 338 may store an operating system and one or more software applications, instructions, programs, and/or data to implement the methods described herein and the functions attributed to the various systems. In various implementations, the memory 318 and 338 may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, aspects of some or all of the components discussed herein may include any models, algorithms, and/or machine-learning algorithms. For example, in some instances, the components in the memory 318 and 338 may be implemented as a neural network.

As described herein, an exemplary neural network is an algorithm that passes input data through a series of connected layers to produce an output. Each layer in a neural network may also comprise another neural network or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning or machine-learned algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

FIGS. 1, 2, 4, and 5 illustrate example processes in accordance with examples of the disclosure. These process are illustrated as a logical flow graph, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be omitted or combined in any order and/or in parallel to implement the processes.

Figure 4:
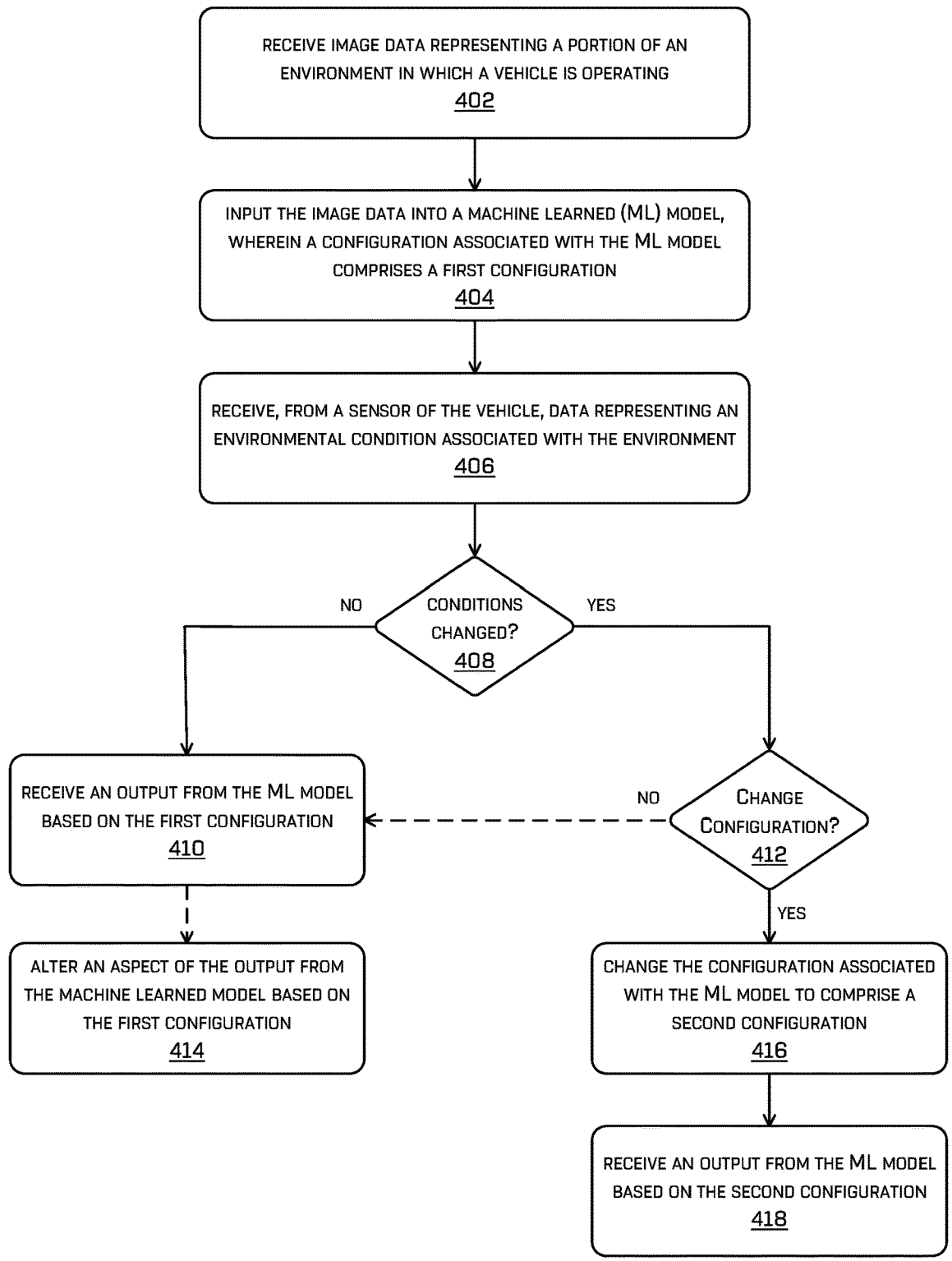
FIG. 4 is an example process for changing vehicle states in response to changes in environmental conditions.

FIG. 4 is an example process 400 for changing vehicle states in response to changes in environmental conditions. The process 400 begins at operation 402, which includes receiving image data representing a portion of an environment in which a vehicle is operating. For instance, image data 118 may be received from one or more image sensors of the vehicle 122, and the image data 118 may include the object 124 (e.g., a vehicle), the object 126 (e.g., a cyclist), and the object 128 (e.g., a pedestrian).

At operation 404, the process 400 includes inputting the image data into a machine learned model, wherein a configuration associated with the ML model comprises a first configuration. For instance, the image data 118 may be input into a vision machine learned model. In some examples, the first configuration may be associated with a first environmental condition. In some examples, inputting the image data into the machine learned model may comprise inputting the image data into a first machine learned model comprising a first configuration, as opposed to inputting the image data into a second machine learned model comprising a second configuration.

At operation 406, the process 400 includes receiving, from a sensor of the vehicle, data representing an environmental condition associated with the environment. For instance, the sensor data 130 may be received from the one or more sensor systems of the vehicle 122. The sensor data may be indicative of an environmental condition associated with an environment in which the vehicle is operating. In some examples, the sensor may comprise a photosensor, and ambient light sensor, a temperature sensor, a microphone sensor, a humidity sensor, a pressure sensor, and/or the like.

Association between a configuration of a machine learned model and an environmental condition can be accomplished by in a variety of manners. For example, each configuration of machine learned model can be associated with one or more environmental features. A certain configuration may have been trained when a corresponding amount of ambient light is present, a corresponding combination of sensor modalities is enabled (e.g., visual camera sensors may be less useful in a rain storm), etc. In certain examples, a confidence level can be determined between current environmental data and data corresponding to one or more configurations of machine learned models. For example, a first configuration of machine learned model can correspond to weightings determined during a rainy night and a second configuration can correspond to weights determined during a clear day. During operation, environmental data may indicate a rainy day. Using the aforementioned confidence level analysis, one of the first configuration and the second configuration can be selected for use with an autonomous vehicle.

In certain examples, each configuration can be associated with a plurality of weighted features indicating an environment that the configuration corresponds to. Features can include an amount of precipitation, an amount of ambient light, a temperature, a time, a humidity, a characterization of sunlight (e.g., direct vs overcast/dispersed), etc. A closest match can be determined between current environmental conditions and a corresponding configuration of machine learned model.

In some examples, a configuration can include a set of weightings to be applied to a machine learned architecture. Certain portions of the weightings can correspond to a different aspect of the environment such that other portions can be duplicated or reused between configurations. In such examples, different portions of the weightings (and/or a machine learned architecture) can each correspond to a different environmental feature. For example, certain nodes or layers of a machine learned neural network architecture can correspond to corresponding one or more environmental features. Changing a configuration of a machine learned model may include replacing a subset of weightings used by the machine learned model.

At operation 408, the process 400 includes determining whether a change in the environmental condition has taken place. For instance, operation 408 may include, based at least in part on the data received in operation 406, determining whether a level of ambient light in the environment proximate the vehicle has changed due to, e.g., daytime transitioning to nighttime, sunny weather transitioning to overcast or cloudy weather, precipitation in the environment, fog or smoke in the environment, and/or the like.

If the environmental conditions have not changed, the process 400 proceeds to operation 410, which includes receiving an output from the machine learned model based on the first configuration. However, if the environmental conditions have changed, the process 400 proceeds to operation 412, which includes determining whether the configuration of the machine learned model is to be changed from the first configuration to a second configuration. In some examples, determining whether the configuration of the machine learned model is to be changed may be based at least in part on a current environmental condition associated with the environment in which the vehicle is operating.

If the configuration of the machine learned model is not to be changed, then the process 400 proceeds to operation 410, which was discussed above, and then to operation 414, which includes altering an aspect of the output from the machine learned model based on the first configuration. For instance, altering the aspect of the output may be to compensate the output for the change in the environmental condition. However, if the configuration of the machine learned model is to be changed, then the process 400 proceeds to operation 416, which includes changing the configuration associated with the ML model to comprise a second configuration. For instance, the second configuration may be associated with the change in the environmental condition. By way of example, if the first configuration is associated with daytime conditions (e.g., a first level of ambient light), then the second configuration may be associated with nighttime conditions (e.g., a second level of ambient light that is less than the first level of ambient light). In some examples, changing the configuration may comprises changing to a second machine learned model that is associated with the second configuration, as opposed to the first machine learned model comprising the first configuration.

At operation 418, the process 400 includes receiving an output from the ML model based on the second configuration. In some instances, the vehicle may be controlled based at least in part on the output. For instance, a trajectory for the vehicle to follow may be determined based at least in part on the output.

Figure 5:
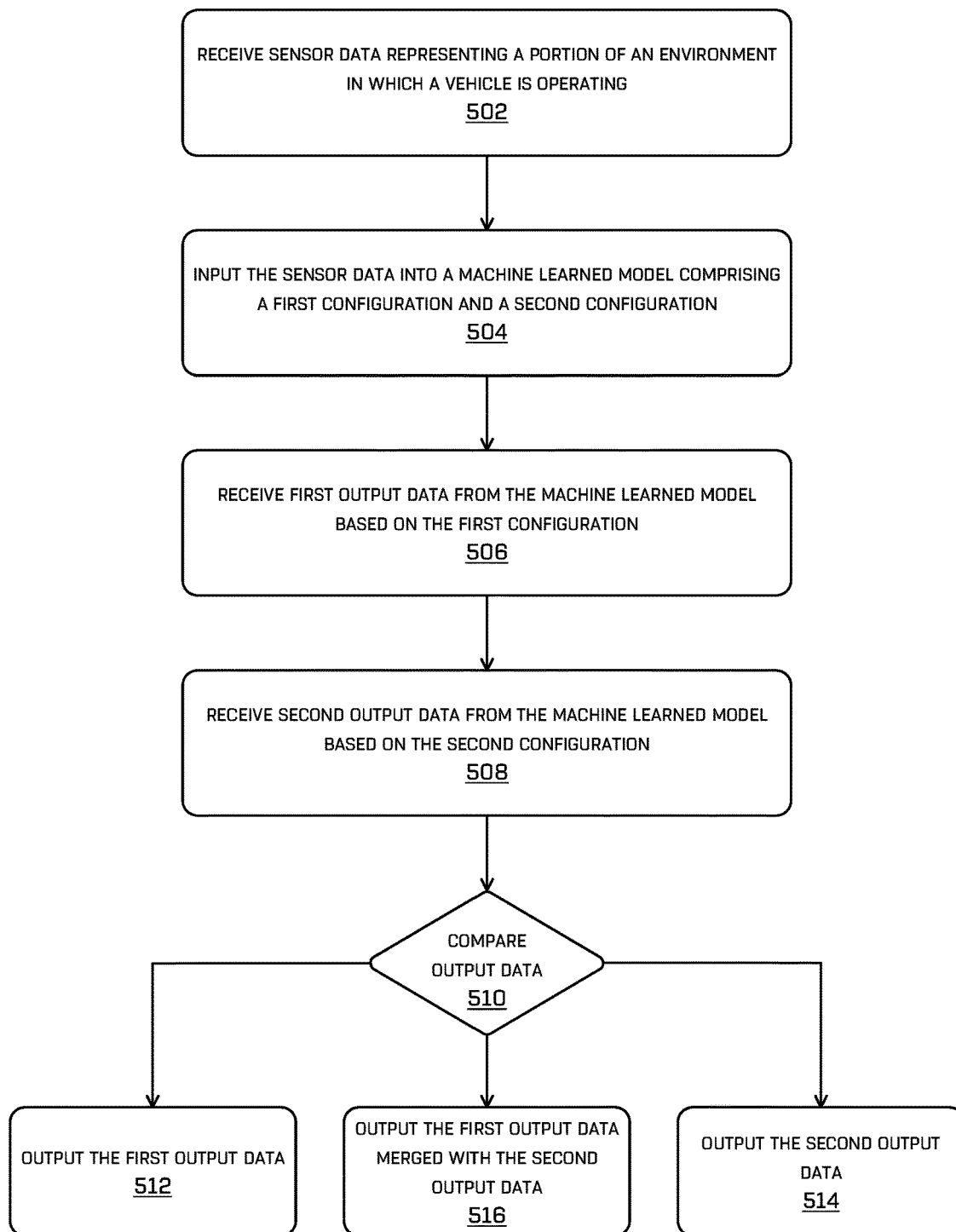
FIG. 5 is an example process for running multiple machine learned models in parallel to improve vehicle performance due to changes in environmental conditions.

FIG. 5 is an example process 500 for running multiple machine learned models in parallel to improve vehicle performance due to changes in environmental conditions. The process 500 begins at operation 502, which includes receiving sensor data representing a portion of an environment in which a vehicle is operating. For instance, the sensor data may comprise the image data 118 that is captured by one or more image sensors of the vehicle 122. The sensor data may comprise multiple types of sensor data, such as image data, ambient light data, audio data, etc. Additionally, the sensor data may comprise preprocessed or raw sensor data.

At operation 504, the process 500 includes inputting the sensor data into a machine learned model comprising a first configuration and a second configuration. In some examples, the first configuration may be associated with a first environmental condition and the second configuration may be associated with a second environmental condition. In some examples, inputting the sensor data may comprise inputting the sensor data into a first machine learned model that is associated with a first configuration and a second machine learned model that is associated with a second configuration. In some instances, the first configuration of the machine learned model may comprise a first set of thresholds, weights, or other parameters, and the second configuration of the machine learned model may comprise a second set of thresholds, weights, or other parameters.

At operation 506, the process 500 includes receiving first output data from the machine learned model based on the first configuration. The first output data may comprise a first confidence score associated with the first output data. At operation 508, the process 500 includes receiving second output data from the machine learned model based on the second configuration. The second output data may comprise a second confidence score associated with the second output data. In some instances, the confidence scores may be based at least in part on an environmental condition associated with an environment in which the vehicle is operating. For instance, sensor data may be received that is indicative of the environmental condition, and based at least in part on the environmental condition, the confidence scores may be determined.

At operation 510, the process 500 includes comparing the first output data and the second output data to determine which to output. In some examples, comparing the first output data and the second output data may comprise comparing the first confidence score with the second confidence score to see which confidence score comprises a higher confidence score. Additionally, or alternatively, comparing the first output data and the second output data may comprise comparing an amount of detected objects shown by each of the first output data and the second output data, comparing predicted trajectories associated with the detected objects shown by each of the first output data and the second output data, comparing ambient light states associated with the first output data and the second output data, etc.

At operation 512, the process 500 includes outputting the first output data. For instance, if the first confidence score associated with the first output data comprises a higher confidence score than the second confidence score associated with the second output data, then the first output data may be selected to be output. In some examples, determining to output the first output data may be based at least in part on the environmental condition associated with the environment in which the vehicle is operating, and the first configuration of the machine learned model. That is, the first configuration associated with the machine learned model may be associated with the environmental condition.

At operation 514, the process 500 includes outputting the second output data. For instance, if the second confidence score associated with the second output data comprises a higher confidence score than the first confidence score associated with the first output data, then the second output data may be selected to be output. In some examples, determining to output the second output data may be based at least in part on the environmental condition associated with the environment in which the vehicle is operating, and the second configuration of the machine learned model. That is, the second configuration associated with the machine learned model may be associated with the environmental condition.

At operation 516, the process 500 includes outputting the first output data merged with the second output data. For instance, the first confidence score and the second confidence score may be equal, or within a threshold range of each other, and the first output data and the second output data may be merged. Additionally, or alternatively, each of the first output data and the second output data may include different objects, and the outputs may be merged to include a more accurate number of the objects in the environment. In some instances, merging the first output data with the second output data may comprise processing the first output data and the second output data (e.g., with another machine learned model) to merge the output data.

EXAMPLE CLAUSES

A. A system comprising: one or more processors; and one or more non-transitory computer-readable media storing instructions executable by the one or more processors, wherein the instructions, when executed, cause the system to perform operations comprising: receiving, from an ambient light sensor of an autonomous vehicle, ambient light data representing an amount of ambient light within an environment in which the autonomous vehicle is operating; determining, based at least in part on the ambient light data, that the amount of ambient light within the environment meets a threshold amount of ambient light; determining, based at least in part on the amount of ambient light meeting the threshold amount of ambient light, a machine learned model; receiving, from an image sensor associated with the autonomous vehicle, image data representing a portion of the environment; inputting the image data into the machine learned model; and performing an action associated with at least one of the machine learned model or an output of the machine learned model.

B. The system as paragraph A recites, wherein the threshold amount of ambient light is associated with an operational amount of ambient light associated with the image sensor of the autonomous vehicle.

C. The system as any one of paragraphs A-B recites, wherein: the machine learned model comprises a first machine learned model configuration, and the determining, based at least in part on the amount of ambient light meeting the threshold amount of ambient light, the machine learned model includes adopting the first machine learned model configuration and not a second machine learned model configuration.

D. The system as any one of paragraphs A-C recites, wherein the first machine learned model configuration differs from the second machine learned model configuration in at least one of: a threshold associated with the machine learned model; a weight associated with a parameter of the machine learned model; or a confidence level associated with an aspect of the output of the machine learned model.

E. A method comprising: receiving, from a sensor of the vehicle, data representing an environmental condition associated with the environment; determining, based on the data representing the environmental condition associated with the environment, a configuration of a machine learned model; receiving image data representing a portion of an environment in which a vehicle is operating; inputting the image data into the machine learned model; and performing an action associated with the vehicle based on output received from the machine learned model.

F. The method as paragraph E recites, wherein the sensor of the vehicle comprises at last one of a photosensor, a microphone, or an image sensor, and wherein the environmental condition comprises at least one of ambient light in the environment or a weather condition in the environment.

G. The method as any one of paragraphs E-F recites, wherein: the sensor of the vehicle comprises the photosensor; and the environmental condition comprises ambient light in the environment.

H. The method as any one of paragraphs E-G recites, wherein: the sensor of the vehicle comprises the microphone; the data comprises audio data; and the weather condition comprises precipitation in the environment.

I. The method as any one of paragraphs E-H recites, wherein: the configuration of the machine learned model comprises a first configuration of the machine learned model associated with the environmental condition; a second configuration of the machine learned model is associated with a differing environmental condition; and the determining, based on the data representing the environmental condition, includes adopting the first configuration of the machine learned model and not the second configuration of the machine learned model.

J. The method as any one of paragraphs E-I recites, wherein the first configuration and the second configuration of the machine learned model share a same machine learned model architecture.

K. The method as any one of paragraphs E-J recites, wherein the determining the configuration of the machine learned model including determining a confidence level associated with the data representing an environmental condition and the configuration of the machine learned model.

L. The method as any one of paragraphs E-K recites, further comprising: determining an ambient lighting state associated with the image data; and determining the configuration of the machine learned model based at least in part on the ambient lighting state associated with the image data.

M. The method as any one of paragraphs E-L recites, wherein the first configuration and second configuration of the machine learned model differ based on a threshold associated with the machine learned model.

N. The method as any one of paragraphs E-M recites, wherein the first configuration and second configuration of the machine learned model differ based on a weight associated with the machine learned model.

O. One or more non-transitory computer-readable media storing instructions that, when executed, cause one or more processors to perform operations comprising: receiving, from an environmental sensor of the vehicle, data representing an environmental condition associated with the environment; determining, based on the data representing the environmental condition associated with the environment, a configuration of a machine learned model; receiving, from an image sensor, image data representing a portion of an environment in which a vehicle is operating; inputting the image data into the machine learned model; performing an action associated with the vehicle based on output received from the machine learned model.

P. The one or more non-transitory computer-readable media as paragraph O recites, wherein: the first sensor comprises an image sensor; the second sensor comprises at least one of a photosensor or a microphone; and the environmental condition comprises at least one of ambient light in the environment or precipitation in the environment.

Q. The one or more non-transitory computer-readable media as any one of paragraphs O-P recites, wherein: the configuration of the machine learned model comprises a first configuration of the machine learned model associated with the environmental condition; a second configuration of the machine learned model is associated with a differing environmental condition; and the determining, based on the data representing the environmental condition, includes adopting the first configuration of the machine learned model and not the second configuration of the machine learned model.

R. The one or more non-transitory computer-readable media as any one of paragraphs O-Q recites, wherein the determining the configuration of the machine learned model including determining a confidence level associated with the data representing an environmental condition and the configuration of the machine learned model.

S. The one or more non-transitory computer-readable media as any one of paragraphs O-R recites, the operations further comprising: determining an ambient lighting state associated with the image data; and determining the configuration of the machine learned model based at least in part on the ambient lighting state associated with the image data.

T. The one or more non-transitory computer-readable media as any one of paragraphs O-S recites, wherein the first configuration and the second configuration of the machine learned model differ based on a threshold associated with the machine learned model or a weight associated with the machine learned model.

U. A system comprising: one or more processors; and one or more non-transitory computer-readable media storing instructions executable by the one or more processors, wherein the instructions, when executed, cause the system to perform operations comprising: receiving data associated with an environment of an autonomous vehicle; characterizing, based on the data, one or more features of the environment; adopting, based on the one or more features, a set of weightings for a machine learned model wherein the set of weightings are one of several sets of weights associated with a machine learned model architecture; applying the set of weightings to a machine learned model wherein the machine learned model includes the machine learned model architecture; receiving, from an image sensor associated with the autonomous vehicle, image data representing a portion of the environment; inputting the image data into the machine learned model; and controlling, based on the output data, an aspect of the vehicle.

V. The system as paragraph U recites, wherein the one or more features includes: an amount of ambient light; or a weather condition.

W. The system as any one of paragraphs U-V recites, wherein the adopting the set of weightings includes: comparing a values of the one or more features to a corresponding value associated with the set of weightings.

X. The system as any one of paragraphs U-W recites, wherein the set of weightings is a set of tensors and the machine learned model architecture is a neural network.

Y. A method comprising: receiving sensor data representing a portion of an environment in which a vehicle is operating; determining, based on the sensor data, a first set of weightings associated with a machine learned model wherein the first set of weighting is one of several sets of weightings; applying the first set of weightings to a machine learned model; inputting the sensor data into the machine learned model; receiving output data from the machine learned model; controlling, based on the output data, an aspect of the vehicle.

Z. The method as paragraph Y recites, wherein the first set of weightings is associated with a first environmental condition and a second set of the several sets of weightings is associated with a second environmental condition different from the first environmental condition.

AA. The method as any one of paragraphs Y-Z recites, wherein the first environmental condition comprises a first level of ambient light in the environment and the second environmental condition comprises a second level of ambient light in the environment.

BB. The method as any one of paragraphs Y-AA recites, wherein the first environmental condition comprises a first amount of precipitation in the environment and the second environmental condition comprises a second amount of precipitation in the environment.

CC. The method as any one of paragraphs Y-BB recites, wherein the determining the first set of weightings associated with the machine learned model is based on a first confidence score indicating an association between the first set of weightings and the sensor data.

DD. The method as any one of paragraphs Y-CC recites, further comprising characterizing, based on the sensor data, one or more features of the environment, wherein the determining the first set of weightings is based on the one or more features.

EE. The method as any one of paragraphs Y-DD recites, wherein the one or more features include an amount or type of precipitation or an amount of ambient light.

FF. The method as any one of paragraphs Y-EE recites, wherein the vehicle includes several different modalities of sensors and the one or more features indicate a relative effectiveness between the several different modalities of sensors.

GG. The method as any one of paragraphs Y-FF recites, wherein the first set of weightings shares corresponding weights with a second set of the several sets of weightings.

HH. The method as any one of paragraphs Y-GG recites, wherein the set of weightings is a set of tensors and the machine learned model is a neural network.

II. One or more non-transitory computer-readable media storing instructions that, when executed, cause one or more processors to perform operations comprising: receiving sensor data representing a portion of an environment in which a vehicle is operating; determining, based on the sensor data, a first set of weightings associated with a machine learned model wherein the first set of weighting is one of several sets of weightings; applying the first set of weightings to a machine learned model; inputting the sensor data into the machine learned model; receiving output data from the machine learned model; and controlling, based on the output data, an aspect of the vehicle.

JJ. The one or more non-transitory computer-readable media as paragraph II recites, wherein the first set of weightings is associated with a first environmental condition and a second set of the several sets of weightings is associated with a second environmental condition different from the first environmental condition.

KK. The one or more non-transitory computer-readable media as any one of paragraphs II-JJ recites, wherein the first environmental condition comprises a first level of ambient light in the environment and the second environmental condition comprises a second level of ambient light in the environment.

LL. The one or more non-transitory computer-readable media as any one of paragraphs II-KK recites, wherein the vehicle includes several different modalities of sensors and the one or more features indicate a relative effectiveness between the several different modalities of sensors.

MM. The one or more non-transitory computer-readable media as any one of paragraphs II-LL recites, wherein the operations further comprise characterizing, based on the sensor data, one or more features of the environment, wherein the determining the first set of weightings is based on the one or more features.

NN. The one or more non-transitory computer-readable media as any one of paragraphs II-MM recites, wherein the set of weightings is a set of tensors and the machine learned model is a neural network.

While the example clauses described above are described with respect to one particular implementation, it should be understood that, in the context of this document, the content of the example clauses may also be implemented via a method, device, system, computer-readable medium, and/or another implementation. Additionally, any of examples A-NN may be implemented alone or in combination with any other one or more of the examples A-NN.

Conclusion

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

The invention claimed is:

1. A system comprising:
one or more processors; and
one or more non-transitory computer-readable media storing instructions executable by the one or more processors, wherein the instructions, when executed, cause the system to perform operations comprising:
receiving data associated with an environment of an autonomous vehicle;
characterizing, based on the data, one or more features of the environment;
selecting, based on the one or more features and from among multiple available sets of weightings associated with a machine learned model architecture, a first set of weightings for a machine learned model configured to accept the multiple available sets of weightings;
receiving, from an image sensor associated with the autonomous vehicle, image data representing a portion of the environment;
inputting the image data into the machine learned model, wherein the machine learned model architecture is configured by applying the first set of weightings to the machine learned model;
receiving, from the machine learned model configured with the first set of weightings and based at least in part on the image data, a first output data;
selecting, based on the one or more features and from among the multiple available sets of weightings associated with the machine learned model architecture, a second set of weightings for the machine learned model configured to accept the multiple available sets of weightings;
inputting the image data into the machine learned model, the machine learned model comprising the machine learned model architecture configured by applying the second set of weightings to the machine learned model;
receiving, from the machine learned model configured with the second set of weightings and based at least in part on the image data, a second output data;
comparing, as a comparison, the first output data and the second output data;
determining, based at least in part on the comparison, a selected output, wherein the selected output comprises at least one of:
the first output data,
the second output data, or
a merged output data based at least in part on combining the first output data and the second output data; and
controlling, based at least in part on the comparison and the selected output, an aspect of the autonomous vehicle.

2. The system of claim 1, wherein the one or more features includes:
an amount of ambient light; or
a weather condition.

3. The system of claim 1, wherein the machine learned model is configured with the first set of weightings or the second set of weightings based at least in part on:
comparing a value of the one or more features to a corresponding value associated with at least one of the first set of weightings or the second set of weightings.

4. The system of claim 1, wherein at least one of the first set of weightings or the second set of weightings is a set of tensors and the machine learned model architecture is a neural network.

5. The system of claim 1, wherein the first set of weightings is determined based at least in part on a first set of training conditions and the second set of weightings is determined based at least in part on a second set of training conditions different from the first set of training conditions.

6. The system of claim 1, wherein:
the machine learned model comprises a plurality of layers;
an available set of weightings associated with the machine learned model architecture comprises a plurality of weightings;
a weighting of the plurality of weightings is applied to a layer of the plurality of layers; and
the weighting of the plurality of weightings is used by the machine learned model when an input is passed through the layer of the plurality of layers.

7. The system of claim 1, wherein the image data is input into the machine learned model configured with the second set of weightings in parallel to the image data being input into the machine learned model configured with the first set of weightings.

8. A method comprising:
receiving sensor data representing a portion of an environment in which a vehicle is operating;
determining, based on the sensor data and from among multiple available sets of weightings, a first set of weightings and a second set of weightings associated with a machine learned model configured to accept the multiple available sets of weightings;
inputting the sensor data into the machine learned model, wherein the machine learned model is configured by applying the first set of weightings to the machine learned model;
receiving first output data from the machine learned model configured by applying the first set of weightings to the machine learned model;
inputting the sensor data into the machine learned model, wherein the machine learned model is configured by applying the second set of weightings to the machine learned model;
receiving second output data from the machine learned model configured by applying the second set of weightings to the machine learned model;
comparing, as a comparison, the first output data and the second output data;
determining, based at least in part on the comparison, a selected output, wherein the selected output comprises at least one of:
the first output data,
the second output data, or
a merged output data based at least in part on combining the first output data and the second output data; and
controlling, based at least in part on the comparison and the selected output, an aspect of the vehicle.

9. The method of claim 8, wherein the first set of weightings is associated with a first environmental condition and a second set from among the multiple available sets of weightings is associated with a second environmental condition different from the first environmental condition.

10. The method of claim 9, wherein the first environmental condition comprises a first level of ambient light in the environment and the second environmental condition comprises a second level of ambient light in the environment.

11. The method of claim 9, wherein the first environmental condition comprises a first amount of precipitation in the environment and the second environmental condition comprises a second amount of precipitation in the environment.

12. The method of claim 8, wherein the determining the first set of weightings from among the multiple available sets of weightings associated with the machine learned model is based on a first confidence score indicating an association between the first set of weightings and the sensor data.

13. The method of claim 8, further comprising characterizing, based on the sensor data, one or more features of the environment, wherein the determining the first set of weightings from among the multiple available sets of weightings is based on the one or more features.

14. The method of claim 13, wherein the vehicle includes several different modalities of sensors and the one or more features indicate a relative effectiveness between the several different modalities of sensors.

15. The method of claim 8, wherein the first set of weightings shares corresponding weights with the second set of weightings.

16. The method of claim 8, wherein the first set of weightings is a set of tensors and the machine learned model is a neural network.

17. One or more non-transitory computer-readable media storing instructions that, when executed, cause one or more processors to perform operations comprising:
receiving sensor data representing a portion of an environment in which a vehicle is operating;
determining, based on the sensor data and from among multiple available sets of weightings, a first set of weightings and a second set of weightings associated with a machine learned model configured to accept the multiple available sets of weightings;
inputting the sensor data into the machine learned model, wherein the machine learned model is configured by applying the first set of weightings to the machine learned model;
receiving first output data from the machine learned model configured by applying the first set of weightings to the machine learned model;
inputting the sensor data into the machine learned model, wherein the machine learned model is configured by applying the second set of weightings to the machine learned model;
receiving second output data from the machine learned model configured by applying the second set of weightings to the machine learned model;
comparing, as a comparison, the first output data and the second output data;
determining, based at least in part on the comparison, a selected output, wherein the selected output comprises at least one of:
the first output data,
the second output data, or
a merged output data based at least in part on combining the first output data and the second output data; and controlling, based at least in part on the comparison and the selected output, an aspect of the vehicle.

18. The one or more non-transitory computer-readable media of claim 17, wherein the first set of weightings is associated with a first environmental condition and the second set of weightings is associated with a second environmental condition different from the first environmental condition.

19. The one or more non-transitory computer-readable media of claim 17, wherein the operations further comprise characterizing, based on the sensor data, one or more features of the environment, the vehicle includes several different modalities of sensors, and the one or more features indicate a relative effectiveness between the several different modalities of sensors.

20. The one or more non-transitory computer-readable media of claim 17, wherein the operations further comprise characterizing, based on the sensor data, one or more features of the environment, wherein the determining the first set of weightings is based on the one or more features.

\* \* \* \* \*